FREDERICK F. TONE
ROBERT F. DEPREZ
ROBERT I. EDELMAN
INVENTORS

BY

ATTORNEYS

United States Patent Office 3,466,440
Patented Sept. 9, 1969

3,466,440
X-RAY FILM PACKAGE WITH IDENTIFICATION SLOT
Frederick F. Tone, Robert F. Deprez, and Robert I. Edelman, Rochester, N.Y., assignors to Eastman Kodak Company, Rochester, N.Y., a corporation of Delaware
Filed Mar. 24, 1967, Ser. No. 625,765
Int. Cl. G01n 23/04
U.S. Cl. 250—67                    6 Claims

ABSTRACT OF THE DISCLOSURE

An X-ray cassette having an identification corner which is constructed to be substantially unaffected by X-rays. The cassette identification corner has a slot for the insertion of radiation directing means which is not influenced directly by X-ray radiation. The radiation directing means prints on the film accurate identification information corresponding to the X-ray image being produced.

---

The present invention relates to a film package and more particularly to a cassette for supporting an X-ray film in a manner suitable for exposure thereof.

A great deal of work has been done in the art of packaging film (including X-ray film) for exposure purposes. However, X-ray films present a unique problem in that the developed radiograph is not unmistakably identifiable with a particular patient because of the X-ray subject matter itself so that positive identification of a radiograph with a particular patient is very difficult. Also, in many medical establishments X-rays are "coned down" to a minimum size to reduce patient dosage and the quantity of scattered radiation in the area being examined. Such "coning down" reduces X-ray exposure at the film periphery. Since the periphery would be the most likely region to place identification (hereinafter referred to as ID) information, depending on the primary X-ray beam to expose a film to ID information is not reliable. The use of a separate X-ray device to expose an ID region is very expensive and requires special hard to use (i.e. lead foil) letters. Because of these problems, ID cards are often taped to a stack of containers of exposed X-ray films to be somehow encoded on the film by a processing technician when the stack reaches the darkroom. Quite clearly, this procedure leaves some room for human and mechanical error. These factors illustrate a serious X-ray ID problem, particularly in the more modern medical facility where automatic processors are used. Automatic processors receive and process a continual stream of more or less unrelated X-ray film sheets and release finished radiograph several minutes later. In such a processor it is not feasible for the operator to maintain contact with any one radiograph. Thus only ID information on the radiograph itself will provide positive identification. However, in the past this has proven expensive and time consuming.

Therefore, an object of the present invention is to provide an improved, simple and reliable X-ray film cassette adapted to facilitate creation of an image on the edge of a film for positive and unmistakable identification.

The novel X-ray cassette has inner foam cushions for compressively supporting an X-ray film sheet. In accordance with one embodiment of the present invention, the cassette is provided with a light leakproof slot for insertion of an illuminatable tongue having transferable ID information therewith. The ID is being transferred to the film by means other than X-ray energy. Therefore, the cassette is constructed to reduce to a minimum any possible fogging of the ID area resulting from X-ray energy applied to the film to accomplish a useful image. Thus, although the major portion of the film is in direct contact with intensifying screens, the screens are omitted from the ID area. Similarly, the lead shields are placed in front of the film in the ID region to further reduce fogging. This construction substantially isolates the ID region from the unreliable peripheral X-ray radiation to increase the intelligibility of the ID information.

The subject matter which is regarded as the present invention is particularly pointed out and distinctly claimed in the concluding portion of this specification. The inventon, however, as to its organization and operation, together with further objects and advantages, will best be understood by reference to the following description taken in connection with the accompanying drawing, in which:

Figure 1:
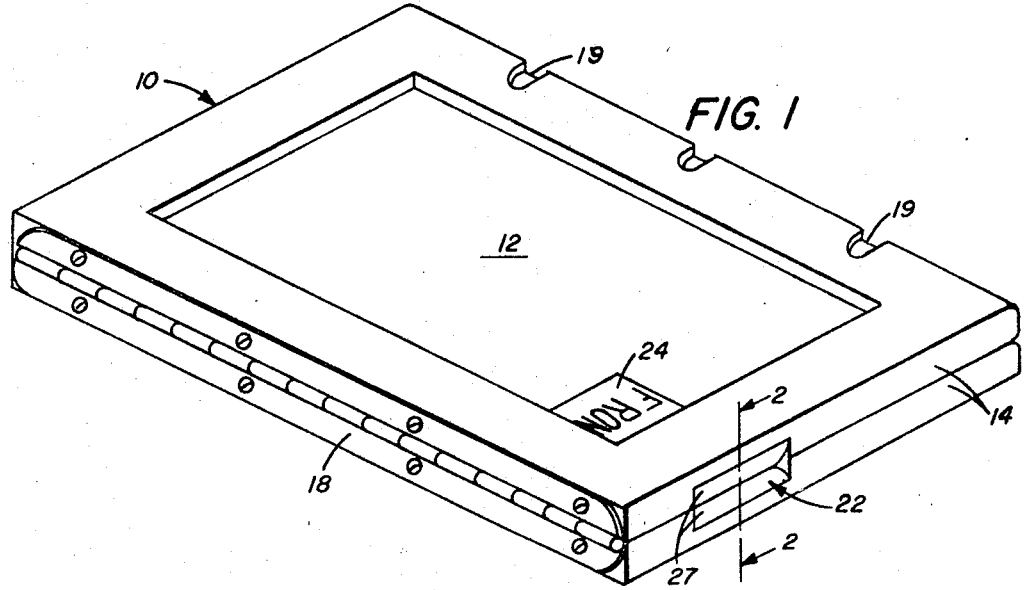
FIG. 1 is a perspective view of a cassette according to the invention.

Referring now to the drawing wherein like numbers identify similar parts, FIG. 1 is a perspective view of a rectangular X-ray cassette 10 having a resilient outer panel 12. The panels 12 are opaque to light radiation but highly transmitting to X-rays. 80 mil magnesium, 60 mil hardened aluminum or certain resilient plastics make quite satisfactory panels 12. The resilient panels 12 are shown as surrounded by a complex opaque frame 14 having a confining groove 15 (FIG. 2) therein. One frame which is quite satisfactory is molded of an elastomeric plastic such as polyethylene or rubber. The grooves 15 supportingly frame the perimeter of each of the panels 12. However, if plastic planels 12 are used the frame 14 may be formed as an integral part thereof.

Figure 2:
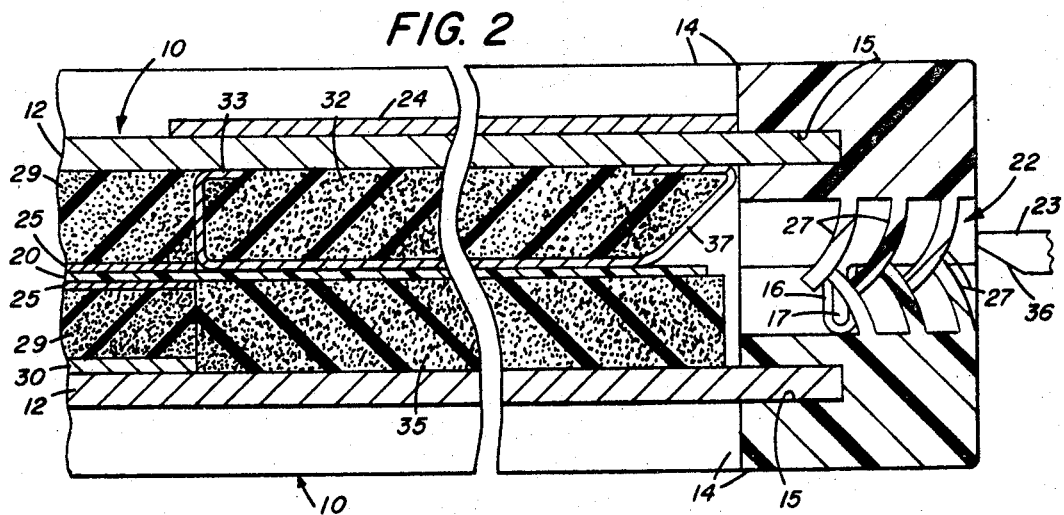
FIG. 2 is a sectional view taken along the line 2—2 of FIG. 1.
Figure 3:
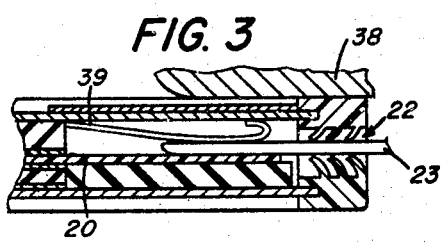
FIG. 3 is simplified view similar to FIG. 2 with the illuminatable tongue inserted.

The frame 14 is also provided with a groove 16 and a protrusion 17 which mate when the frame is closed as shown in FIG. 2, to provide a light tight film compartment. A hinge means 18 is at one edge of the cassette. The hinge may be a piano hinge or a molded elastomeric plastic hinge or the like. The edges of the panels 12 most remote from the hinge 18 are secured by means such as latches or hooks 19 which maintain the cassette closed when loaded with film 20 as shown in FIGS. 2 and 3.

According to the present invention, an ID slot 22 is provided in the closed frame 14. The ID slot 22 is arranged so that it will not substantially weaken the frame 14 and is of a size through which an ID tab or tongue indicated at 23 (FIG. 2) may be inserted as shown in FIG. 3. The tongue 23 contains ID information and illuminating means to enable the creation of an unmistakable latent photographic ID information image on a corner of the film 20 within the cassette.

This corner area of ID information is covered by a patch 24 which has thereon the lettering "front" (FIG. 1) and preferably comprising a dense lead foil. If the patch 24 is not an X-ray blocking material, another patch (not shown) of lead foil is placed on the inside or outside of panel 12 aligned with the patch 24. The lead patch will substantially reduce the passage of X-ray radiation therethrough and will prevent X-ray exposure of the film 20. This is likely to be most needed when a portion of the patient is positioned in front of the patch 24 so that a bone or the like might partially cover the ID area to create a pattern tending to confuse the desired ID information. Thus, by use of this patch and omission of intensifying screens 25, the ID system is entirely independent of the X-ray radiation to be used for exposing the film 20 between the intensifying screens 25.

The reasons for this independence are explained in some detail in the co-pending application Ser. No. 625,827 filed by the inventors of the present invention on the same day, and assigned to the assignee of this case. Generally speaking the X-rays used to expose the film are not reliable for exposing ID information near the film edge because the X-ray beams are often "coned down." Moreover, the provision of an auxiliary X-ray ID system is unreasonably expensive for most X-ray installations.

The tongue insertion slot 22 within the frame 14 is provided with overlapping opuaque resilient flaps 27 which interlock upon one another when the ID tongue 23 is not (FIG. 2) therebetween. When the tongue 23 is inserted (FIG. 3), the flaps 27 press against the tongue surfaces to minimize damaging light leaks therearound. Other auxiliary means, such as dim lights in the X-ray room, may also be provided to prevent leakage of light into the cassette when the tongue 23 is inserted.

As shown in the sectional view of FIG. 2, the panels 12 have secured thereon foam pads 29 which resiliently support the intensifying screens 25 throughout the region remote from the ID region. The particular foam pad system used contemplates compression of the pads 29 more than about 10% and less than about 80% because the pressure is very nearly uniform throughout this midrange; being too soft at 0–10% and too stiff at 80–100%. Coextensive with the screens 25 is a lead foil shield 30 at the back of the cassette to limit unwanted exposure from backscatter effects. With the lead patch 24 placed as shown, the lead foil 30 in back of the ID area may be omitted.

As the tongue 23 carries its own light source, X-ray illumination is not desired. In fact, such X-ray illumination causes degradation of the ID information. Therefore, the intensifying screens 25 are completely omitted from the ID area. The deletion of the intensifying screens 25 reduces the effect of X-ray exposure of the film 20 to about 5–10% of their effectiveness where the screens are used. The use of the lead patch 24 will reduce the X-rays to a fraction of those reaching the intensifying screens 25. Obviously, when one takes this into account and the fact that the X-rays are also often "coned down" at the source thereof to reduce to a minimum scatter losses, etc., it quickly becomes apparent that the effective X-ray image illumination of the ID region is a fractional, or at most about one percent of that in the region of the screens 25 and the backup lead foil 30.

The ID region itself also has foam pillows equivalent to those shown at 29. An upper pillow 32 is wrapped in a slippery plastic sheath 33. A polytetrafluoroethylene sheath will work quite satisfactorily in this capacity. A lower foam pillow 35 is either coated with a dark, light absorbing material or filled with such a material when it is cast. By having the foam pillow 35 nonreflective, backscatter light is reduced to a minimum to improve the sharpness of exposure of the ID information image.

We have found that this tongue identification system is most effective if the tongue 23 has its leading edge 36 slanted to deflect the film 20 toward the side thereof which is to expose the film 20 with the ID information. However, with the slanted edge 36 to be effective in diverting the film to one side, means are provided to facilitate insertion of the tongue 23 between the film and the closest corner of the pillow 32.

In accordance with one embodiment of our invention, and in addition to the slippery sheath 33, the forward edge 37 of the pillow 32 is slanted to be outwardly diverging for facilitating movement of the tongue 23 thereby to a position between the pillow and the film. Also, the tongue 23 should displace only the pillow 32 without materially deflecting the film 20. Any great deflection might degrade the image caused by the primary X-ray exposure, particularly if the X-ray and ID exposures are simultaneous. The limited deflection is facilitated by a backup member 38 (FIG. 3) being spaced a fixed distance from the tongue 23. Thus, the tongue 23 deflects only the pillow 32 (FIG. 2) or a leaf spring 39 of stainless steel or slippery plastic (FIG. 3) without bending the film 20 appreciably.

With the above discussion in mind, it soon becomes clear that the erratic, difficult and expensive X-ray energization of the peripheral ID area is almost completely eliminated whereby the image formed by the illuminated ID tongue 23 will provide distinct, reliable and positive identification of each radiograph.

The invention has been described in detail with particular reference to preferred embodiments thereof, but it will be understood that variations and modifications can be effected within the spirit and scope of the invention as described hereinabove and as defined in the appended claims.

We claim:

1. In an X-ray cassette for supporting a film having a first and a second film surface, during exposure to radiation comprising a pair of panels including a frame portion closeable to define a light-tight compartment; an identification slot along one edge of said cassette for receiving a relatively flat tongue capable of presenting identification indicia to the film; opaque means deflectively positioned to close the slot for preventing the passage of light to the film; intensifying screens covering the major inner surface portion of said panels respectively exclusive of an identification area adjacent the identification slot; first resilient means secured to said panels for supporting said screens and the film held therebetween; other resilient means disposed in said identification area adjacent to said identification slot for supporting the X-ray film therebetween and for receiving the tongue parallel to and in close proximity to the first surface of the received film, the improvement comprising:

said other resilient means adjacent to the first film surface having a slanted outwardly diverging edge directed toward the slot, to guide insertion of the tongue adjacent to the film, said resilient means being of a thickness sufficient to receive the tongue without substantial deflection of the film; and a slippery-surfaced layer on the surface of said resilient means adjacent to the first film surface to facilitate insertion of the tongue.

2. The invention as in claim 1 and wherein:

said opaque means is an integral portion of said frame and said frame is fabricated of a relatively resilient elastomeric substance.

3. The invention as in claim 1 and further comprising:

a lead foil patch in front of the film in the area of said other resilient means.

4. An invention according to claim 1 and further comprising:

a sheet of lead secured to the one of said panels to be placed rearwardly during exposure, for limiting the X-ray backscatter effect after passing through the film; and a second lead sheet secured to the other of said panels only in the area covered by said first pair of pads to reduce X-ray passage to and through the film in the ID area.

5. The invention according to claim 1 wherein:

said frame portion defines the ID slot at an off-center location so that the ID tongue will enter it only if the cassette is presented in a preselected orientation and thereby is able to expose the film in the ID area.

6. The invention according to claim 1 wherein said other resilient means adjacent the second film surface is provided with a non-reflecting surface facing the second film surface.

References Cited

UNITED STATES PATENTS

| | | | |
|---|---|---|---|
| 1,974,174 | 9/1934 | Chamberlain | 250—67 |
| 2,837,658 | 6/1958 | Limbach | 250—67 |
| 3,221,620 | 12/1965 | Sano et al. | 250—67 |
| 3,296,437 | 1/1967 | Meschan | 250—67 |

RALPH G. NILSON, Primary Examiner

S. C. SHEAR, Assistant Examiner